United States Patent [19]

Cambriello

[11] Patent Number: 5,173,959
[45] Date of Patent: Dec. 22, 1992

[54] METHOD AND APPARATUS FOR ASSEMBLING A FIBER ARRAY

[75] Inventor: John A. Cambriello, Wakefield, Mass.

[73] Assignee: GTE Laboratories Incorporated, Waltham, Mass.

[21] Appl. No.: 760,049

[22] Filed: Sep. 13, 1991

[51] Int. Cl.$^5$ .................... G02B 6/26; G01B 11/00; B65H 23/18
[52] U.S. Cl. .................... 385/89; 385/90; 385/91; 385/137; 356/400; 226/1; 226/4
[58] Field of Search .................... 385/49, 52, 80, 89, 385/90, 91, 137, 83, 65; 356/399, 400; 226/1, 4, 7; 250/227.11; 156/158, 160, 60

[56] References Cited

U.S. PATENT DOCUMENTS

| | | | |
|---|---|---|---|
| 4,079,404 | 3/1978 | Comerford et al. | 385/49 |
| 4,345,137 | 8/1982 | Mignien et al. | 385/97 |
| 4,466,696 | 8/1984 | Carney | 385/49 |
| 4,728,187 | 3/1988 | Dubroeucq et al. | 356/400 X |
| 4,746,195 | 5/1988 | Auracher et al. | 356/400 X |
| 4,767,174 | 8/1988 | Carenco et al. | 385/97 |
| 4,772,086 | 9/1988 | Bellerby et al. | 385/89 |
| 4,788,406 | 11/1988 | Holman et al. | 385/128 |
| 4,802,727 | 2/1989 | Stanley | 385/89 |
| 4,930,854 | 6/1990 | Albares et al. | 385/49 |
| 5,109,460 | 4/1992 | Baek | 385/137 X |
| 5,135,590 | 8/1992 | Basavanhally et al. | 385/137 X |

*Primary Examiner*—Brian Healy
*Attorney, Agent, or Firm*—Victor F. Lohmann, III

[57] ABSTRACT

A method and apparatus is disclosed for assembling an array of optical fibers in a substrate. The method comprises forming a series of parallel V-shaped grooves in the top surface of the substrate placing the substrate on a base plate positioning an upper plate in spaced apart relationship with the substrate so as to form channels between the upper plate and the V-shaped grooves. A vacuum is then applied at one end of the channel formed between the upper plate and the V-shaped grooves, and optical fibers are then sequentially fed into each of the V-shaped grooves and are drawn into the grooves to a stop at the other end thereof. The fibers are then bonded to the substrate.

13 Claims, 3 Drawing Sheets

METHOD AND APPARATUS FOR ASSEMBLING A FIBER ARRAY

FIELD OF THE INVENTION

This invention relates to optical packaging and, more particularly, to the placement of individual fibers in fiber-receiving channels using a vacuum action.

BACKGROUND OF THE INVENTION

The efficient transfer of light between generating and receiving components such as lasers and detectors, respectively, requires a suitable transmission medium for facilitating the coupling of light. Optoelectronic devices frequently utilize fibers to perform the optical coupling, and optically align the fibers to the components by integrating the fibers into appropriately-sized channels.

Conventional assemblies for placing fibers into fiber-receiving channels such as silicon V-grooves require active alignment using a precise, multiple-axis micropositioner. However, this "pick and place" procedure is tedious, labor intensive, and requires precise tolerances.

SUMMARY OF THE INVENTION

The present invention is directed to a method of placing fibers into respective fiber-receiving channels of a substrate. The method comprises the steps of introducing a tip of each fiber into an exposed front space of said respective channel, and passively drawing said fibers into said respective channels with a vacuum action.

An apparatus for implementing the above method comprises means for forming a contact surface over each fiber-receiving channel which contacts a fiber resting in the channel at a desired number of surface contact points, means for introducing a tip of each fiber into a front space of the respective channel, and means for developing a vacuum action within the channels whereby each fiber is controllably drawn into the respective channel while being confined to the respective channel by the surface contact points and the fiber contact points.

OBJECTS OF THE INVENTION

It is a principal object of the present invention to obviate the above-noted and other disadvantages of the prior art.

It is a further object of the present invention to provide an apparatus for performing passive fiber alignment.

It is a further object of the present invention to perform passive fiber alignment using a vacuum assembly for drawing individual fibers into respective grooves.

DETAILED DESCRIPTION OF PREFERRED EMBODIMENTS

The present invention is directed to the passive alignment of fibers to optoelectronic components such as lasers and photodetectors. In accordance with the present invention, the front tip of the fiber is initially placed into a front portion of a fiber-receiving channel. The channel is situated relative to a corresponding optoelectronic component such that light from the component can optically access the fiber core once the fiber is placed into the channel. The surfaces of the channel which contact the fiber and an upper surface above the channel define a multi-point contact passageway for guiding the fiber along the channel length. The upper surface will be discussed in further detail below. A sufficient vacuum action is created within the passageway to draw the fiber into the channel.

Figure 1:
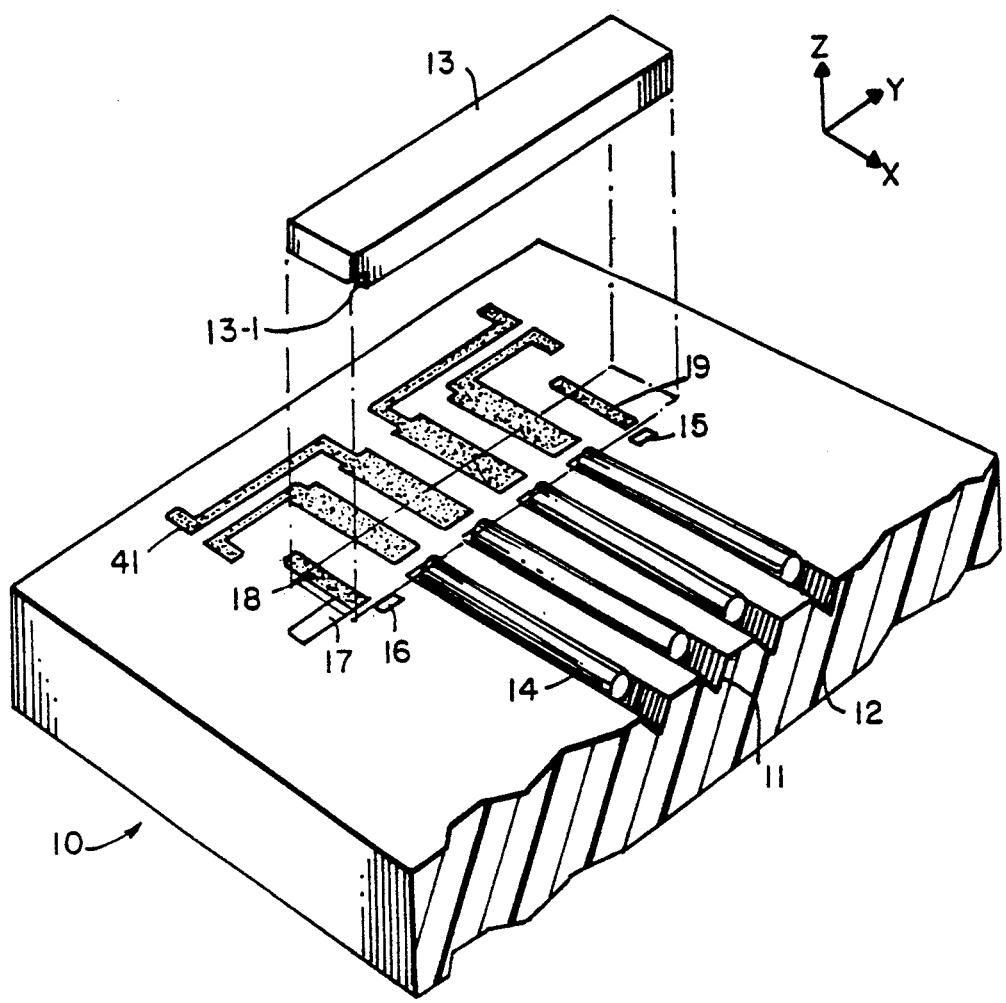
FIG. 1 shows an exemplary optoelectronic package which receives fibers in accordance with the present invention.

FIG. 1 is an upper perspective view, partially in section, of an exemplary optical package having optoelectronic components to which fibers are aligned in accordance with the present invention. This package is for illustrative purposes only as it should be apparent to those skilled in the art that the principles of the present invention are applicable to other optical packages.

The package includes a plurality of V-grooves 11 etched in a silicon substrate 12 to form a silicon waferboard 10. A light-emitting region 13 fabricated as a laser array chip is positioned on the substrate such that the emitted light optically accesses the core region of the fibers 14. In a preferred embodiment of the present invention, the laser array is configured on the substrate using a pedestal arrangement having reference surfaces against which the sidewalls of the array are mated. In particular, three pedestal structures 15, 16, and 17 are formed on substrate 12, and the laser array 13 is fabricated with a notched edge 13-1 that mates with side pedestal 17 when the array 13 is mounted on vertical standoffs 18 and 19 and placed in front abutting contact with front pedestals 15 and 16. The pedestal structures control positioning of the array 13 in the x- and y-directions, while the vertical standoffs control positioning in the z-direction. A metallization pattern provides electrical contact to the individual laser structures in array 13 edge that mates with pedestals on the substrate surface to control laser position in the x and y-directions. Vertical standoffs control laser position in the z-direction.

The aforementioned pedestal arrangement is disclosed in copending patent application entitled "Method and Device for Passive Alignment of Diode Lasers and Optical Fibers", Ser. No. 07/551,219, filed Jul. 11, 1990 by Armiento et al., incorporated herein by reference, which issued as U.S. Pat. No. 5,077,878 on Jan. 7, 1992. As will be discussed hereinafter, a feature of the present invention is the passive placement of fibers 14 within grooves 11. In the following Figures, similar components/structures are referenced with identical numerals.

Figure 2:
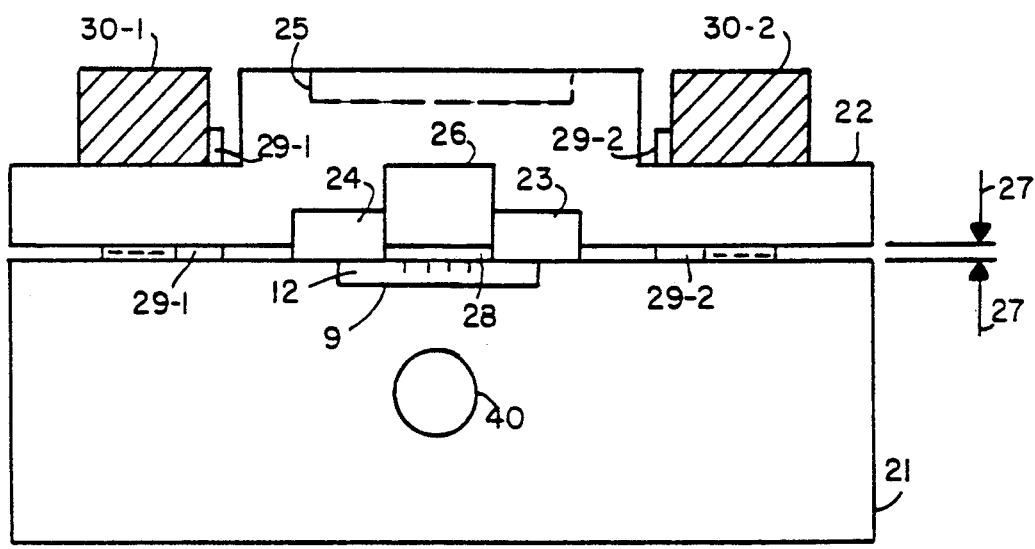
FIG. 2 is a front view of an assembly in accordance with a preferred embodiment of the present invention.

FIG. 2 is a front view of an assembly in accordance with a preferred embodiment of the present invention for aligning fibers to optoelectronic components. A base 21 supports the silicon waferboard 10 of FIG. 1 in an appropriately-sized recess 9 whose perimeter is indicated by the contours of substrate 12. An upper plate 22 includes a contact insert 26 which is placed into a slot located in a forward position on the underside of the plate 22. The plate 22 further includes a recess for accommodating a resilient means which rests on the upper surface of base 21 and supports plate 22. The thickness of the resilient means defines a separation distance between the lower surface of plate 22 and the upper surface of base 21.

Preferably, the resilient means is a U-shaped rubber pad whose two front arms 23 and 24 define the contours of the recess. As shown, the underside of insert 26 and the inner sides of arms 23 and 24 define a vacuum corridor or passageway 28 which extends at least the length of the waferboard. The function of recess 25 in the upper surface of plate 22 will be apparent from the discussion below of FIGS. 3A and 3B.

As shown in FIG. 2, plate 22 rests on an upper surface of the pad with a resultant gap 27 between the underside of plate 22 and the upper surface of base 21. The resiliency of the pad and the dimensions of the pad and insert 26 are chosen such that a vacuum corridor 28 of desired dimensions is formed above the waferboard surface and which extends the length of the fiber-receiving channels 11. The dimensions of the corridor are such that the upper wall of the corridor (which is the underside of insert 26) serves as an upper contact surface for the fibers when moving through the V-grooves. Consequently, when the fibers are being drawn through the individual V-grooves, the fibers are restricted to the grooves due to the 3-point contact passageway developed by the two sides of the V-grooves and the upper wall of corridor 28 corresponding to the underside of insert 26.

The base 21 includes two posts 29-1 and 29-2 which fit through corresponding openings in plate 22 to mate the assembly. Screws 30-1 and 30-2 are inserted through respective openings in plate 22 and adjustably threaded into base 21 to adjust the width of the gap 27 (defined by the thickness of the resilient means) for facilitating the entry and placement of various-sized fibers in the grooves. The base 21 may also include a heater knock-out hole 40.

Figure 3A:
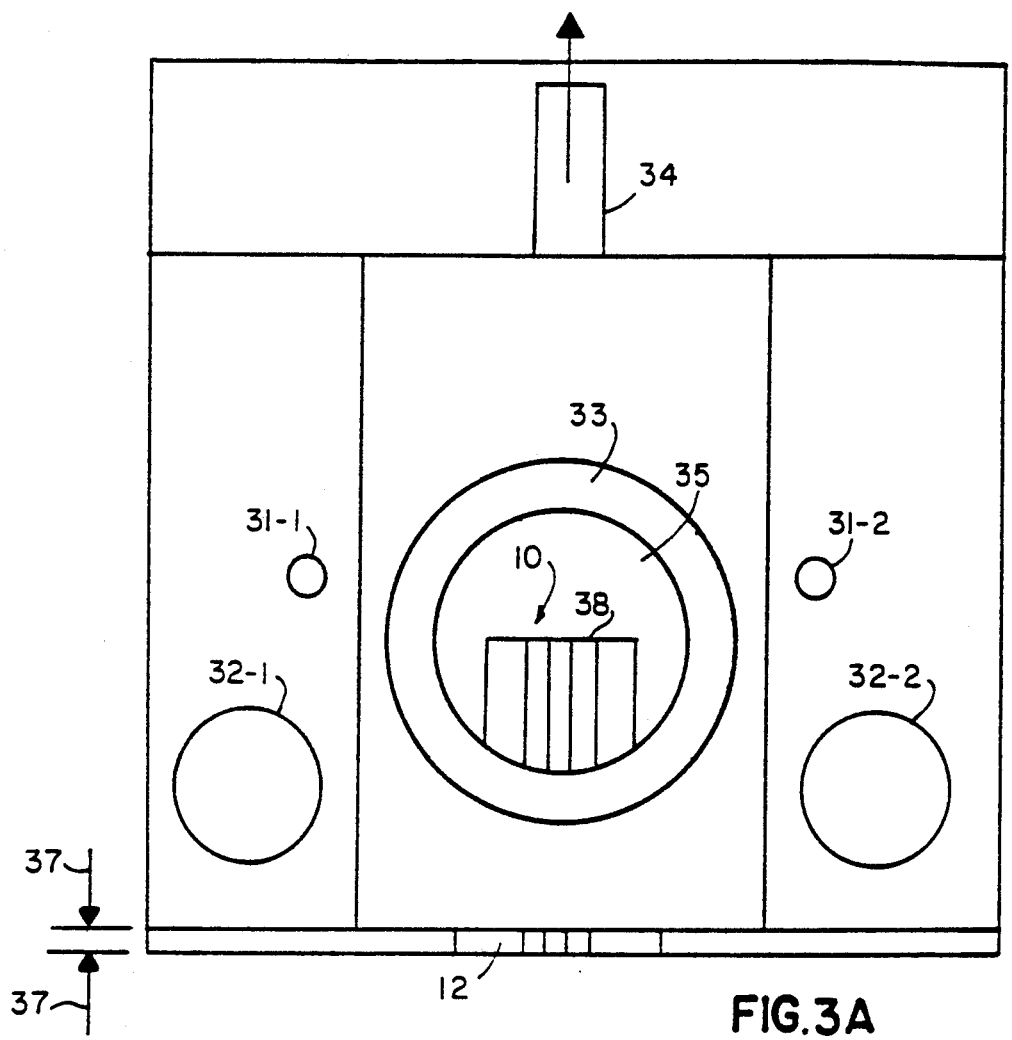
FIG. 3A is an upper view of the assembly in FIG. 2.

FIG. 3A is an upper plan view of the assembly in FIG. 2. Openings 32-1 and 32-2 in the upper surface of plate 22 receive screws 30-1 and 30-2, respectively, of FIG. 2. Similarly, openings 31-1 and 31-2 receive posts 29-1 and 29-2, respectively, of FIG. 2. As shown, section 25 in FIG. 2 is a circular recess with a mounting surface 33 for receiving a quartz glass disc to seal the assembly prior to commencement of the vacuum action. The quartz glass also serves as a viewing port for observing fiber placement in the channels of the waferboard. An air passage in plate 22 connects cylindrical chamber 35 to a tube 34 extending rearwardly from plate 22.

A vacuum apparatus for creating a suction action is attached to tube 34. As noted above, the fiber tips are sequentially or collectively introduced into the waferboard channels into an extended groove section 37 of the waferboard. When the vacuum apparatus is operational, sufficient suction is created to draw the fibers into their respective channels until the tip thereof reaches the end 38 of the groove. The fibers are guided through the channels by the passageway formed by the 3-point contact of the V-groove and upper surface of the vacuum corridor.

Figure 3B:
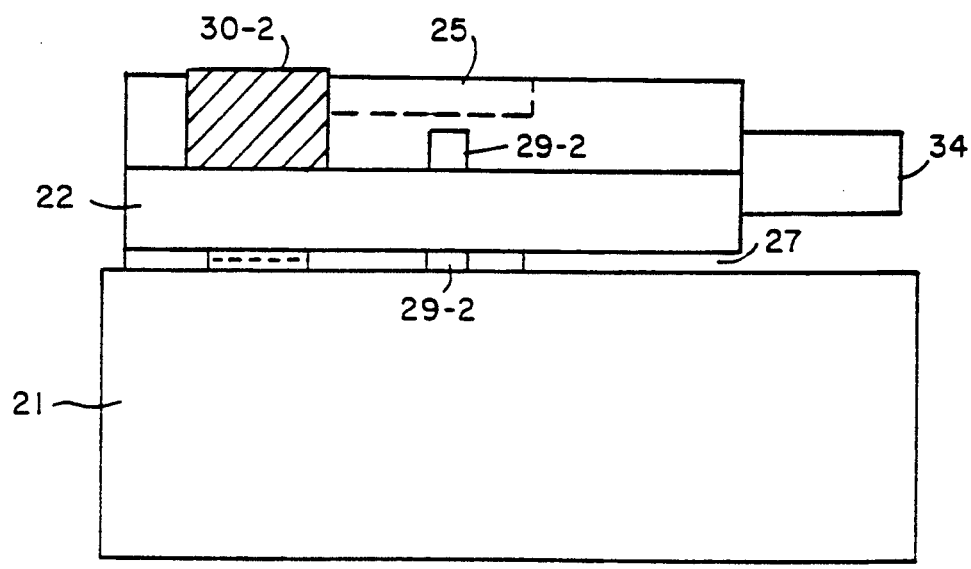
FIG. 3B is a lateral view of the assembly in FIG. 2.

An assembly according to FIGS. 2, 3A, and 3B was constructed with the following design specifications (in inches). The ridge structure of plate 22 having recess 25 situated therein has a width of 0.750 wherein the full width of the plate 22 is 1.750. The dimensions of the recess are 0.5 (diameter) by 1/16 (thick), with the vacuum passage extending between chamber 35 and tube 34 being a cylindrical passage of 0.100 diameter. Openings 32-1 and 32-2 provide clearance holes and are located 0.250 from a front edge and 0.250 from a side edge of plate 22, while openings 31-1 and 31-2 each provide a 0.125 clearance hole and are located 0.375 from the front edge and 0.375 from the side edge of plate 22.

Base 21 has a length of 1.750 and a depth of 1.250. The silicone U-shaped rubber pad is adjustably compressible to thicknesses between 0.004" and 62.5 microns to accommodate a fiber which when resting in the V-groove has its upper surface approximately 70 to 72 microns from the substrate surface. The pad is 0.500 (length) by 0.500 (width) wherein each arm is 0.200 wide with a 0.100-long slit extending 0.215 along the arms. However, it should be obvious to those skilled in the art that other fibers and rubber pads with different dimensions may be used. The waferboard is extended 0.031 beyond a front edge of the assembly to expose the channels for facilitating placement of the fibers therein.

What has been shown and described in FIGS. 2–3B is an assembly for placing fibers in fiber-receiving channels in accordance with a preferred embodiment of the present invention. However, it should be apparent to those skilled in the art that other such assemblies may be constructed to accomplish passive fiber alignment utilizing a vacuum operation. For example, the substrate may include fiber-receiving channels other than V-grooves, and the assembly may not necessarily have the channel etched in the substrate but rather integrated with the substrate in some manner.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method of placing fibers into respective fiber-receiving channels of a substrate, comprising the steps of:
    introducing a tip of each fiber into an exposed front space of said respective channel; and
    passively drawing said fibers into said respective channels with a vacuum action.

2. The method as recited in claim 1 further includes the step of:
    developing a confinement corridor with an upper surface along the length of each channel for substantially confining each fiber to said respective channel while being passively drawn into said respective channel.

3. The method as recited in claim 2 wherein:
    each channel is a V-shaped groove such that each fiber contacts said respective groove at two surface points and contacts the upper surface of said confinement corridor at a single surface point.

4. A method for making a fiber optic array by placing optical fibers in a silicon substrate, comprising the steps of:
    forming one or more V-shaped grooves in said silicon substrate, said grooves extending longitudinally along the upper surface of said silicon substrate;
    placing a resilient gasket around three sides of the upper surface of said substrate, leaving open one end containing the V-shaped grooves, said gasket extending above the upper surface of said substrate by a desired amount relative to the diameter of said optical fibers;

forming slots in said gasket on the side opposite the open end of said V-grooves, said slots having a width less than the diameter of said fibers to form a stop for said fibers;

placing an upper plate over the substrate on top of said gasket, thereby forming a passageway between said upper plate and said substrate; and inserting optical fibers sequentially into respective V-shaped grooves while simultaneously applying a vacuum to said passageway, said vacuum originating from behind said stop adjacent said channel, whereby said fibers are drawn into said respective V-shaped grooves up to said stop.

5. An apparatus for positioning fibers in respective fiber-receiving channels of a substrate wherein each fiber contacts said respective channel at fiber contact points, comprising:

means for forming a contact surface over each fiber-receiving channel which contacts a fiber resting in said channel at a desired number of surface contact points;

means for introducing a tip of each fiber into a front space of said respective channel; and means for developing a vacuum action within said channels whereby each fiber is controllably drawn into said respective channel while being confined to said respective channel by said surface contact points and said fiber contact points.

6. An optical fiber array assembly apparatus comprising:

a silicon substrate having one or more V-shaped grooves extending longitudinally along its upper surface;

an upper plate positioned over the top of said substrate, said upper plate and said V-grooves forming channels in said substrate;

a resilient gasket surrounding three sides of the upper surface of said substrate, separating said upper plate from said substrate, leaving open one end of said grooves and forming a fiber stop at the opposite end of said V-grooved channels;

means for introducing optical fibers into the open end of said channels; and means for applying a vacuum to said open ends of said V-groove channels remote from the point of entrance of said optical fibers to draw said optical fibers into the channels to a stop therein formed as part of said resilient gasket.

7. An apparatus in accordance with claim 6 which includes means for applying adhesive to said optical fibers to bond said fibers to said substrate.

8. An apparatus in accordance with claim 6 in which said substrate rests on a base plate and gap adjustment screws pass through said upper plate and screw into said base plate to adjust the separation between said substrate and said upper plate.

9. An apparatus in accordance with claim 6 in which said substrate is placed within a preformed slot in said base plate.

10. An apparatus in accordance with claim 8 in which said base plate comprises means for heating said substrate to cure thermosetting adhesive injected into said V-shaped grooves to bond said fibers to said substrate.

11. An apparatus in accordance with claim 6 in which said upper plate has an inspection window incorporated therein above said fiber stop to permit examination of the ends of said optical fibers after they have been drawn into said V-groove channels.

12. An article of manufacture for placing fibers into respective fiber-receiving channels of a substrate, made by the following steps:

introducing a tip of each fiber into an exposed front space of said respective channel; and passively drawing said fibers into said respective channels with a vacuum action.

13. A method of placing fibers into respective fiber-receiving channels of a substrate, comprising the steps of:

introducing a tip of each fiber into an exposed front space of said respective channel; and developing a sufficient vacuum action within said channel such that each fiber is advanced along a length of said respective channel.

* * * * *